Jan. 2, 1951     J. A. MURRAY     2,536,612
HOSE CLAMP
Filed June 7, 1947

Inventor
John A. Murray
By Thomas W. J. Clark
Attorney

Patented Jan. 2, 1951

2,536,612

UNITED STATES PATENT OFFICE 2,536,612

HOSE CLAMP

John A. Murray, Baltimore County, Md.

Application June 7, 1947, Serial No. 753,300

8 Claims. (Cl. 24—19)

This invention relates to hose clamps for securing rubber or fabric hose to nipples or couplings and the like.

The patent to Embree No. 1,815,145, July 21, 1931, shows a hose clamp on which the improvement of the present invention may be used.

The nut holding the bolt in the present invention is formed of a single sheet metal piece which has been folded longitudinally upon itself and which has been transversely threaded through the fold center and between the folds so that some of the threads occur in the fold center and on the opposed sections of the folded sheet metal. It is preferred that in the initial folding, that the folds should not be brought in contact, but that a small space should be left between them. In this structure the ends of the folds serve as trunnions for the nut to be held by the convolutions of the parallel rings as shown in the above patent. It is preferable that the folds be left slightly expanded at their extreme ends, and that they be larger than the convolutions so as to hold the two rings together.

In the use of the clamp of the above patent it will be apparent that the convolutions tend to tighten and become smaller with the application of tension on the screw upon its tightening. This tension is transmitted to the rings and tends to make the convolutions smaller. This tendency of the convolutions to become smaller upon tension being placed on the clamp, places additional tension upon the folds of the nut to squeeze them tightly together and consequently to squeeze them more tightly upon the bolt threads. Actual tests have broken the head from the screw as a first failure rather than the nut releasing.

The nut of this invention is not only self-tightening and self-locking as described but it is also most economical both of material and workmanship for its manufacture.

Other objects and advantages of the invention will be apparent from the following description and the accompanying drawings in which.

Figure 1:
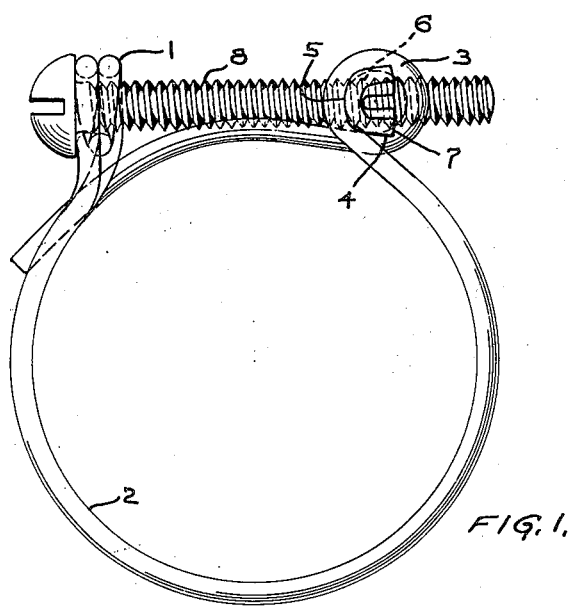
Figure 1 is a side elevation of a hose clamp constructed in accordance with this invention.
Figure 2:
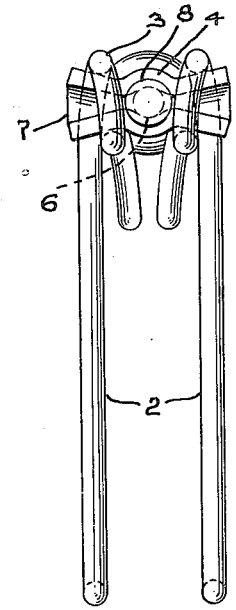
Figure 2 is an edge elevation thereof.
Figure 3:
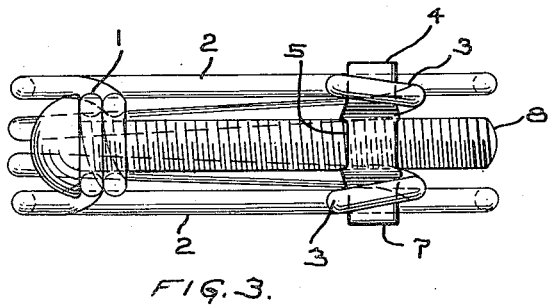
Figure 3 is a top plane view thereof.
Figure 4:
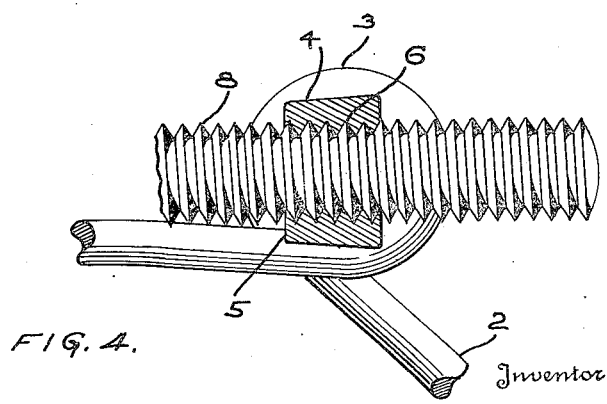
Figure 4 is an enlarged partially sectional fragmentary view showing the tightening action on the nut folds.

The clamp of the invention is preferably made of a single length of wire with a helix 1 at its center and the ends of the wire, from the helix, are formed into two parallel rings 2. Adjacent but spaced from their ends each ring is bent reversely to form an external ring or convolution 3. These rings 3 are preferably formed, one with a right hand and the other with a left hand turn, as shown. The rings or convolutions are axially aligned and their axis is parallel with the axis of the larger rings.

A nut 4 is formed from a single flat piece of metal bent longitudinally upon itself but leaving a space between the separate folds. This U-shaped member is then tapped through the center 5 of the fold intermediate its ends and the threads also are on the adjacent faces of the folds as at 6. The ends 7 of the folded nut are formed spread apart so that they are larger than the convolutions and when placed in these convolutions as trunnions for the nut hold the large rings together. A bolt 8 is placed through the originally formed helix and through the threaded folded nut 4.

The nut is formed of sufficiently strong material to afford a firm hold and not to open up even upon lightly tightening the screw. When the screw is tightened hard, the convolutions are drawn smaller to a lesser inner diameter, and this tightening of the convolutions correspondingly draws the folds of the nut toward one another and upon the screw, holding it most firmly and locking the screw from any possible loosening effect. The tighter the screw is drawn the tighter is the hold of the nut upon the screw.

Since some modifications may be made in the invention as described, that description is intended not to limit the scope of the invention.

What is claimed as new and is desired to be secured by Letters Patent is:

1. A hose clamp having convolutions which are axially aligned and removed from the clamp ends and a screw having a nut thereon for tightening said clamp, characterized by the nut being a sheet folded upon itself longitudinally, the distance between the fold ends, at their transverse center between the fold ends, being substantially equal to the root diameter of the screw, and being threaded through the fold center to engage said screw and held by its ends in said convolutions, the convolutions tightening on the nut upon tightening the screw and preventing the expansion of the nut from around the screw.

2. A hose clamp having convolutions which are axially aligned and removed from the clamp ends and a screw having a nut thereon for tightening said clamp, characterized by the nut being a sheet folded upon itself longitudinally, the distance between the folds, at their transverse center between the fold ends, being substantially equal to the root diameter of the screw, and being threaded between the folds for engaging said screw, and held by its ends in said convolutions and in which the folds at the sheet ends are spread apart, larger than said convolutions, to hold the convolutions in engagement with said folds, the convolutions tightening on the nut upon tightening the screw and preventing the expansion of the nut from around the screw.

3. A hose clamp having convolutions which are axially aligned and removed from the clamp ends and a screw having a nut thereon for tightening said clamp, characterized by the nut being a sheet folded upon itself longitudinally, the distance between the folds, at their transverse center between the fold ends, being substantially equal to the root diameter of the screw, and being threaded through the fold center and between the folds to engage said screw, and held by its ends in said convolutions and in which tightening the screw tightens the convolutions and squeezes the folds of the nut together and increases the hold of the nut on the screw.

4. In a clamp including a bolt for tightening said clamp and bearings which are distorted to close upon tightening of said clamp, the combination with said clamp of a folded sheet nut carried by said bearings and engaging said bolt, the closing distortion of said bearings causing the folds to press upon said bolt to hold the bolt tightly upon tightening said clamp.

5. A clamp including a bolt for tightening said clamp and bearings which are distorted to close upon tightening of said clamp characterized by a nut comprising a folded sheet carried by said bearings and threadedly engaging said bolt between its folds, the closing distortion of said bearings causing the folds to press upon said bolt to hold it tightly upon tightening said clamp.

6. In combination with a clamp including a bolt for tightening of said clamp and convolutions which are distorted to close upon tightening of said clamp, a folded sheet with ends in said convolutions, said bolt passing through said sheet and engaged by the folds thereof, the closing distortion of said convolutions upon tightening of said clamp causing the folds to engage said bolt more tightly and hold it firmly.

7. A trunnioned retainer for receiving a tightening bolt of a clamp having looped bearings which are distorted to close upon tightening of the clamp, comprising a folded sheet for receiving said bolt between the folds and for mounting in the loops of said bearings whereby the closing distortion of said bearings further folds said sheet to press on said bolt to hold it securely upon tightening of the clamp.

8. A trunnioned retainer for receiving a tightening bolt of a clamp having looped bearings which are distorted to close upon tightening of the clamp, comprising a folded sheet for receiving said bolt between the folds and for mounting in the loops of said bearings whereby the closing distortion of bearings further folds said sheet to press on said bolt to hold it securely upon tightening of the clamp, and in which portions of the folds are substantially spaced for holding said retainer in the loops of said bearings.

JOHN A. MURRAY.

REFERENCES CITED

The following references are of record in the file of this patent:

UNITED STATES PATENTS

| Number | Name | Date |
| --- | --- | --- |
| 2,002,671 | McLaughlin | May 28, 1935 |
| 2,349,809 | Black | May 30, 1944 |